(12) United States Patent
Aoki (10) Patent No.: US 12,219,104 B2
(45) Date of Patent: Feb. 4, 2025

(54) INFORMATION PROCESSING METHOD, INFORMATION PROCESSING SYSTEM AND INFORMATION PROCESSING APPARATUS

(71) Applicant: CASIO COMPUTER CO., LTD., Tokyo (JP)

(72) Inventor: Nobuhiro Aoki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 18/543,464

(22) Filed: Dec. 18, 2023

(65) Prior Publication Data

US 2024/0214497 A1    Jun. 27, 2024

(30) Foreign Application Priority Data

Dec. 22, 2022  (JP) ................................. 2022-205570

(51) Int. Cl.
*G06F 15/00*    (2006.01)
*H04N 1/00*    (2006.01)

(52) U.S. Cl.
CPC ..... *H04N 1/00477* (2013.01); *H04N 1/00464* (2013.01)

(58) Field of Classification Search
None
See application file for complete search history.

(56) References Cited

U.S. PATENT DOCUMENTS

| | | | | |
|---|---|---|---|---|
| 8,355,155 | B2* | 1/2013 | Fujii | G06F 3/1259 358/1.14 |
| 8,817,308 | B2* | 8/2014 | Tonegawa | H04N 1/00217 709/224 |
| 11,765,289 | B2* | 9/2023 | Yamanaka | H04N 1/0048 358/1.15 |
| 2005/0114767 | A1* | 5/2005 | Sato | H04N 1/00509 715/274 |
| 2011/0205588 | A1* | 8/2011 | Yabe | G06F 3/1213 358/1.15 |
| 2012/0075311 | A1 | 3/2012 | Tomita et al. | |
| 2013/0188211 | A1* | 7/2013 | Matsushita | G06K 15/1848 358/1.15 |
| 2018/0210678 | A1* | 7/2018 | Miyamoto | G06F 3/1205 |

FOREIGN PATENT DOCUMENTS

| | | | |
|---|---|---|---|
| JP | 2000207315 | A | 7/2000 |
| JP | 2006322907 | A | 11/2006 |
| JP | 2012073859 | A | 4/2012 |
| JP | 2023059130 | A | 4/2023 |

* cited by examiner

*Primary Examiner* — Mark R Milia
(74) *Attorney, Agent, or Firm* — Scully, Scott, Murphy & Presser, P.C.

(57) ABSTRACT

A method for causing a computer to perform: causing a client to start displaying a predetermined notification; executing predetermined image processing on data; and causing the client to end the displaying of the notification in response to the predetermined image processing being completed and a predetermined time or longer elapsing from the start of the displaying of the notification.

9 Claims, 11 Drawing Sheets

INFORMATION PROCESSING METHOD, INFORMATION PROCESSING SYSTEM AND INFORMATION PROCESSING APPARATUS

CROSS-REFERENCE TO RELATED APPLICATION

This application claims priority to and benefit of Japanese Patent application No. 2022-205570 filed on Dec. 22, 2022. The entire specification, claims, and drawings of Japanese Patent application No. 2022-205570 are incorporated herein by reference.

TECHNICAL FIELD

The disclosure of the present specification relates to an information processing method, an information processing system, and an information processing apparatus.

BACKGROUND

Known is a technology for displaying a notification indicating a progress status of an upload on a screen of a management terminal apparatus while data is being uploaded from a dedicated terminal to the management terminal apparatus (for example, JP2000-207315A).

SUMMARY

One illustrative aspect of the present disclosure provides a method for causing a computer to perform: causing a client to start displaying a predetermined notification; executing predetermined image processing on data; and causing the client to end the displaying of the notification in response to the predetermined image processing being completed and a predetermined time or longer elapsing from the start of the displaying of the notification.

DETAILED DESCRIPTION

Referring to the drawings, an information processing method, an information processing apparatus, an information processing system, a method or a program that is executed by the information processing apparatus, which is an example of a computer, according to one illustrative embodiment of the present disclosure will be described in detail.

Figure 1:
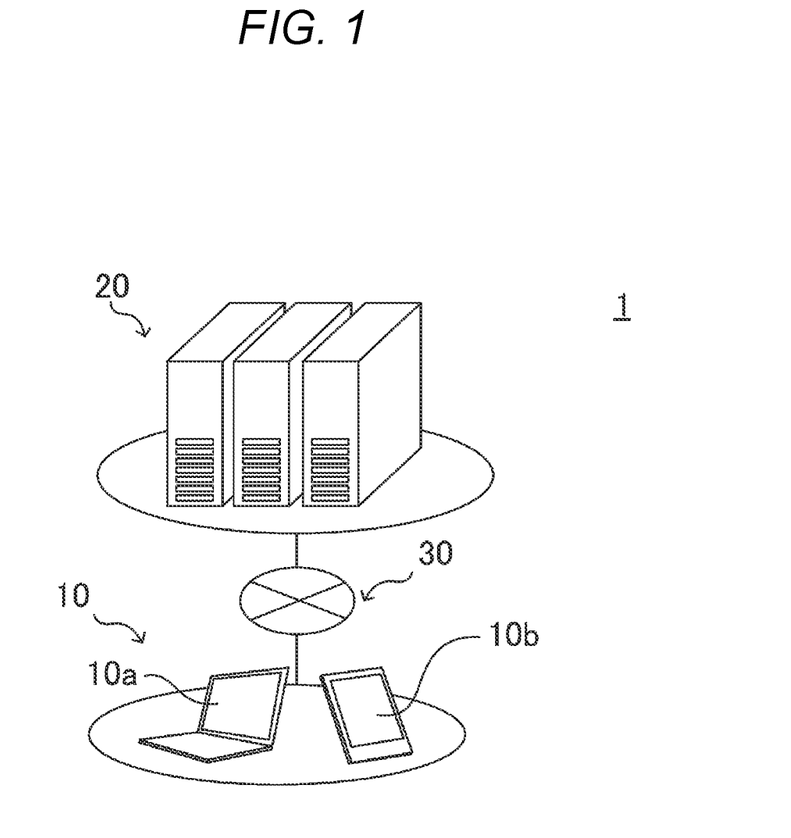
FIG. 1 is a view showing a configuration example of a system according to one illustrative embodiment.
Figure 2:
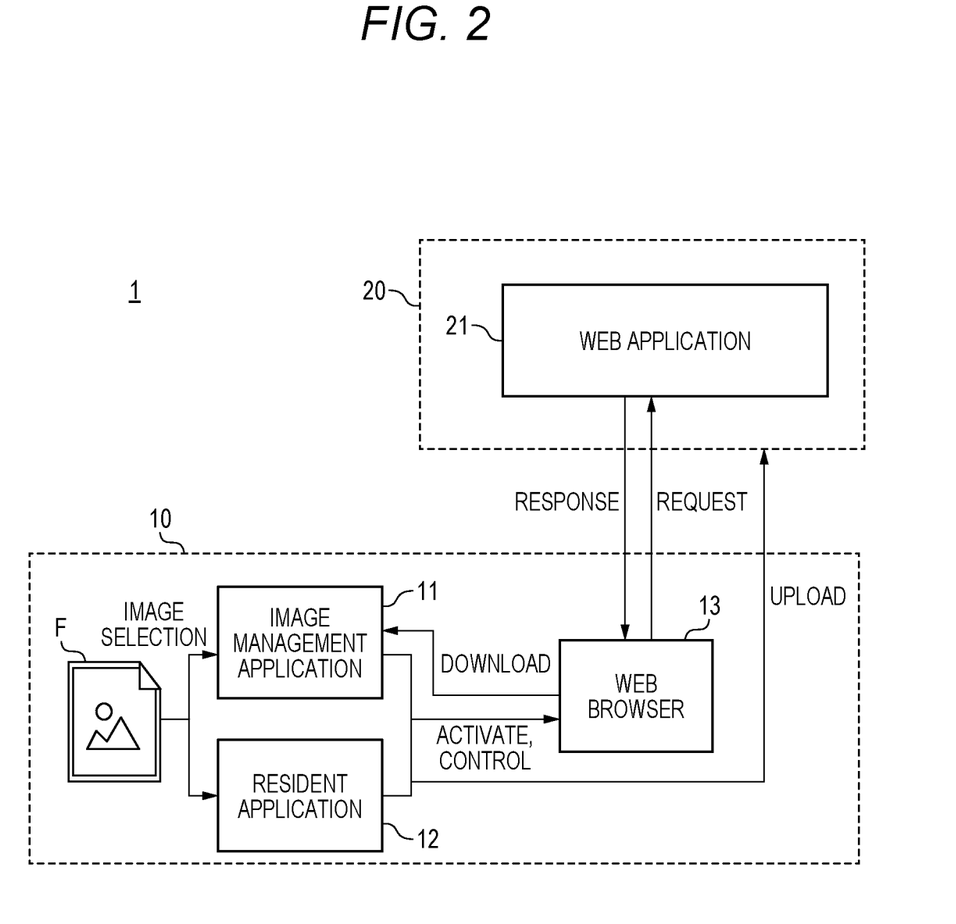
FIG. 2 is a view showing a configuration example of an application operating on the system according to one illustrative embodiment.

FIG. 1 is a view showing a configuration example of a system 1 according to the present illustrative embodiment. FIG. 2 is a view showing a configuration example of an application operating on the system 1 according to the present illustrative embodiment. The system 1 shown in FIGS. 1 and 2 is a Web application system that provides an image analysis function to a user. Hereinafter, the configuration of the system 1 will be described with reference and FIGS. 1 and 2.

The system 1 is an example of the information processing system according to the present illustrative embodiment. As shown in FIG. 1, the system 1 includes one or more client apparatuses 10 (a client apparatus 10a and a client apparatus 10b) and a server apparatus 20, which are communicatively connected via a network 30. The network 30 is, for example, the Internet, but is not limited to the Internet, and the apparatuses may be connected through a dedicated line or the like.

The server apparatus 20 is an example of the information processing apparatus according to the present illustrative embodiment, and is also an example of the computer that executes the method and program according to the present illustrative embodiment.

As shown in FIG. 2, the server apparatus 20 is an apparatus on which a Web application 21 that provides an image analysis function operates. The Web application 21 is an example of Web server software, and includes the program according to the present illustrative embodiment.

The Web application 21 provides an image analysis function to only a user who has successfully completed authentication processing. In the Web application 21, processing of analyzing image data of an image file uploaded from the client apparatus 10, processing of causing an analysis result to be displayed on a Web browser 13 of the client apparatus 10, processing of outputting the analysis result to the client apparatus 10 as an image file, and the like are performed.

The client apparatus 10 is a terminal that is operated directly by a user, and, as shown in FIG. 2, accesses the Web application 21 operating on the server apparatus 20 by using the Web browser 13. At least the Web browser 13 is installed in the client apparatus 10. In addition, at least one of an image management application 11 and a resident application 12 is installed in the client apparatus 10.

The Web browser 13 is an example of the client, and communicates with the Web application 21, which is an example of the Web server software, using a predetermined protocol to display a Web content on a screen.

The image management application 11 is an application that manages image files, and also operates as a viewer application for browsing an image file to be managed. In the client apparatus 10, as one of a plurality of functions provided by the image management application 11, a function for supporting access to the Web application 21, which will be described below, is provided. In the image management application 11, authentication information for logging in to the Web application 21 may be registered. The authentication information is, for example, a user ID and a password.

The image management application 11 classifies image files to be managed on the basis of metadata of the image files. For example, the image management application 11 may classify the image files on the basis of shooting date and time included in metadata of the image files, or classify the image files on the basis of identifiers for identifying photographic subjects included in the metadata of the image files. For example, the image management application 11 may cause image data of image files classified into a same group to be displayed as a list on a display unit of the client apparatus 10.

The resident application 12 is an application that provides a function for supporting access to the Web application 21, which will be described below. In the resident application 12 as well, similar to the image management application 11, authentication information for logging in to the Web application 21 may be registered.

By activating and controlling the Web browser 13 via any one of the image management application 11 and the resident application 12, the client apparatus 10 can notify an image file F saved in the client apparatus 10 and selected by the user to the Web application 21 as a target of image analysis, in response to a user's predetermined operation (for example, several click operations, and the like). This makes it possible to display an image confirmation page P5 (refer to FIG. 3), which will be described below, on the Web browser 13, and the user can further instruct image analysis on the image confirmation page P5 to cause the Web application 21 to analyze the image file F without performing a cumbersome operation. This will be described below in detail.

Figure 3:
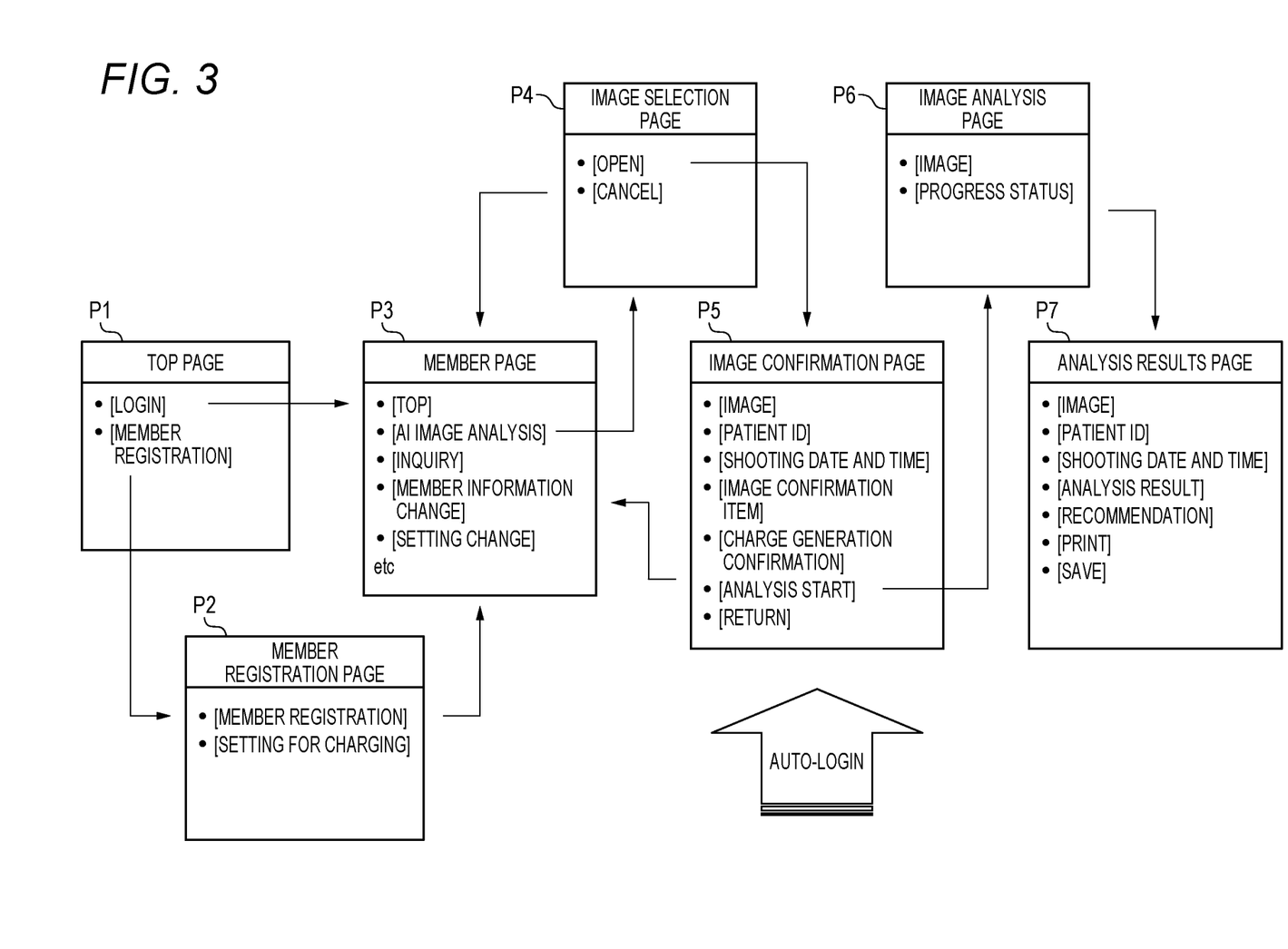
FIG. 3 is a view showing an example of a screen transition of a Web application operating on a server apparatus according to one illustrative embodiment.

FIG. 3 is a view showing an example of a screen transition of the Web application operating on the server apparatus 20 according to the present illustrative embodiment. As shown in FIG. 3, at least 7 pages are prepared in the Web application 21. Below, a role of each page of the Web application 21 will be described in brief.

Hereinafter, an example will be described in which the Web application 21 is an application for supporting a doctor's diagnosis of the presence or absence of skin diseases, and a doctor who is a user uploads an image file including data of a dermoscopy image obtainable from a dermoscope to the Web application 21.

Note that the dermoscope is a magnifying glass that can magnify and non-invasively observe a location suspected to be a lesion on the skin while reducing reflected light from the skin surface. For this reason, a dermoscopy image obtained by the dermoscope is suitable for identifying skin diseases. However, the image data to be input is not limited to image data of the dermoscopy image and image data of a medical image. In addition, the use of the Web application 21 is not limited to diagnostic support for a doctor.

A top page P1 includes an input form for inputting authentication information. When a user inputs authentication information into the input form and selects a "Login" button by a click operation, authentication processing is performed in the Web application 21. If authentication is successful, the screen transitions to a member page P3.

In addition, the top page P1 includes a link to a member registration page P2. When the user selects the link by a click operation, the screen transitions to the member registration page P2.

On the member registration page P2, member registration and a setting for charging associated with image analysis are performed. By performing the member registration and the like on the member registration page P2, the screen transitions to the member page P3. A user who visits a site of the Web application 21 for the first time performs member registration on the member registration page P2. Thereby, from the next time, by inputting the authentication information on the top page P1, the user can access the member page P3 without passing through the member registration page P2.

The member page P3 has various links (a link to the top page P1, a link to an inquiry page, a link to a member information change page, a link to a setting change page), as well as a link written as "AI image analysis." When the user selects "AI image analysis" by a click operation, the screen transitions to an image selection page P4.

On the image selection page P4, any image file on the client apparatus 10 can be selected. By selecting an image file including image data to be analyzed and selecting an "Open" button by a click operation, the screen transitions to an image confirmation page P5. On the other hand, by selecting a "Cancel" button through a click operation, the screen transitions to the member page P3 again. Note that the image selection page P4 may be replaced with a standard file selection dialogue.

The image confirmation page P5 includes a region for displaying information (image, patient ID, shooting date and time) of an image file selected on the image selection page P4, and a region for displaying various precautions for image analysis (image confirmation item, charge generation confirmation). Note that the patient ID and the shooting date and time are metadata included in the image file.

The image confirmation item is to urge a user to confirm, for example, whether an image is a dermoscopy image, whether a region suspected to be a lesion in the image occupies a certain proportion or more of an image region, and the like. The charge generation confirmation is to notify a user in advance that a use charge will be generated as a result of performing image analysis and the charge will be charged to the user.

When the user who has carefully confirmed the information on the image file and the precautions on the image confirmation page P5 selects an "Analysis Start" button by a click operation, image analysis is started, and the screen transitions to an image analysis page P6. Note that when a "Return" button is selected by a click operation (e.g., button B52 in FIG. 8), the screen transitions to the member page P3.

On the image analysis page P6, a progress status of the image analysis is displayed along with the information on the image file to be analyzed, and when the image analysis ends, the screen transitions to an analysis result page P7.

The analysis result page P7 includes a region for displaying the information on the image file (an image, a patient ID, a shooting date and time), and a region for displaying an analysis result, recommendation information, and the like.

The analysis result is, for example, information indicating a degree of certainty regarding the presence or absence of a disease determined by the analysis. The degree of certainty may be expressed quantitatively using a numerical value, a graph, or the like, or may be expressed qualitatively using a sentence, a picture, or the like. The recommendation information is information indicating whether it is required to recommend a medical institution that can make a more advanced or specialized diagnosis.

The information displayed on the analysis result page P7 can be output to a printing apparatus and printed by selecting a "Print" button provided on the analysis result page P7 through a click operation. In addition, the information displayed on the analysis result page P7 can be output to the client apparatus 10 and saved as an image file (also referred to as an analysis result file) by selecting a "Save" button provided on the analysis result page P7 through a click operation (e.g., button B72 in FIG. 9). Note that the information displayed on the analysis result page P7 may also be saved as a file of another format (for example, a PDF file) including image data, instead of the image file.

As described above, the Web application 21 described above can analyze the image data of the image file selected by the user, and provide a user with the analysis result in various formats such as a Web page (analysis result page P7), a printed product, and an electronic file represented by an image file. Therefore, by using the Web application 21, a doctor who is the user can obtain an objective advice on the presence or absence of a disease and make a final diagnosis by referring to the obtained information.

Figure 4:
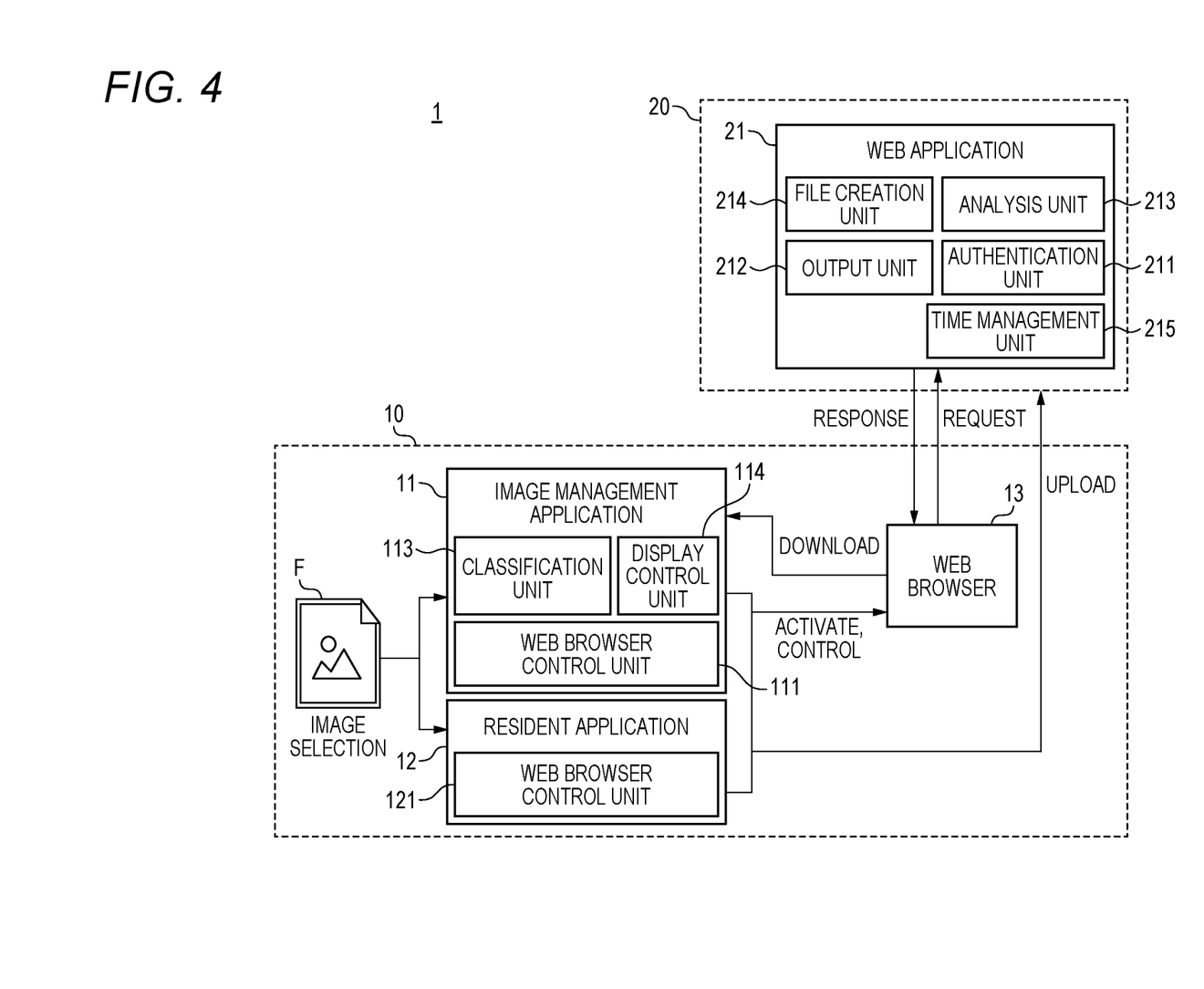
FIG. 4 is a view showing a functional configuration example of an application operating on the system according to one illustrative embodiment.

FIG. 4 is a view showing a functional configuration example of an application operating on the system 1 according to the present illustrative embodiment. Hereinafter, referring to FIG. 4, a structure will be described which improves access to the image analysis function of the Web application 21 implemented by the system 1 described above and allows a user to use the image analysis function without an effort. In addition, a structure will also be described which facilitates management of the image analysis result downloaded from the server apparatus 20.

The former structure is implemented by providing the client apparatus 10 with a Web browser control unit (a Web browser control unit 111, a Web browser control unit 121). In addition, the former structure is implemented by providing the server apparatus 20 with an authentication unit 211 and an output unit 212.

Additionally, the latter structure is implemented by providing the client apparatus 10 with a classification unit 113 and a display control unit 114. Additionally, the latter structure is implemented by providing the server apparatus 20 with an analysis unit 213 and a file creation unit 214.

The server apparatus 20 further includes a time management unit 215. The time management unit 215 will be described below.

The Web browser control unit (a Web browser control unit 111, a Web browser control unit 121) is configured to implement a function of controlling the Web browser 13, and is implemented in the image management application 11 and the resident application 12 in the client apparatus 10. Specifically, as shown in FIG. 4, the image management application 11 has a Web browser control unit 111, and the resident application 12 has a Web browser control unit 121.

The Web browser control unit (the Web browser control unit 111, the Web browser control unit 121) activates the Web browser 13, in response to a user's predetermined operation performed in a state in which the image file F is selected, and causes the Web browser 13 to transmit a request for a URL (which is an abbreviation for Uniform Resource Locator) of the Web application 21 toward the server apparatus 20. The request includes authentication information saved in advance in the client apparatus 10 and information on the image file F.

The authentication information included in the request is, for example, information registered in advance in the image management application 11 or the resident application 12. In addition, the authentication information included in the request may be information registered in the Web browser 13 in association with the URL of the Web application 21.

The authentication information registered in the Web browser 13 is, for example, authentication information that is used for an autocompletion function of the Web browser 13. The authentication information may be permanently stored or may be stored in a cookie for a limited period of time.

The authentication unit 211 and the output unit 212 are configured to implement a function of directly accessing the image confirmation page P5 by shortcutting the top page P1, the member page P3, and the image selection page P4, and are implemented in the Web application 21 in the server apparatus 20.

The authentication unit 211 processes the request transmitted to the server apparatus 20 by the Web browser control unit activating the Web browser 13. Specifically, the authentication unit 211 performs authentication processing by using the authentication information, in response to the request for the URL of the Web application 21 transmitted from the client apparatus 10 and including the authentication information and the information on the image file.

The URL of the request may be, for example, a URL of the top page P1 or a URL of the image confirmation page P5. In addition, if the URL of the request is a URL of the Web application 21, the URL may be a URL different from URLs from the top page P1 to the analysis result page P7.

When the authentication unit 211 receives a request for a predetermined URL including the authentication information and the information on the image file, the authentication unit performs authentication processing by using the authentication information included in the request.

The output unit 212 outputs a response, in response to an authentication result in the authentication unit 211, and causes the image data of the image file F to be displayed on the display unit of the client apparatus 10 as image data that is to be analyzed by the image analysis function of the Web application 21.

Specifically, when the authentication result is successful, the output unit 212 transmits a response including the image confirmation page P5 to the client apparatus 10. Note that if the URL of the request is different from that of the image confirmation page P5, the output unit 212 may redirect to the image confirmation page P5 and output a response. Thereby, the image confirmation page P5 displaying the information on the image file F is displayed on the Web browser 13.

In this way, in the system 1, when the user simply performs a predetermined operation in a state in which the image file F is selected on the client apparatus 10, the Web browser 13 is activated via the Web browser control unit and accesses the Web application 21. In addition, in the server apparatus 20, the login processing (authentication processing) is automatically performed, in response to the request from the Web browser 13, and a response including the image confirmation page P5 on which the image data of the image file F selected by the user is set as an analysis target is output. As a result, the image confirmation page P5 is displayed on the Web browser 13. Therefore, the user can use the image analysis function of the Web application 21 simply by confirming the image confirmation page P5 and inputting an analysis instruction.

The analysis unit 213 is configured to implement a function of analyzing image data in accordance with an analysis instruction from the user, and is implemented in the Web application 21 in the server apparatus 20.

The analysis unit 213 analyzes image data of an image file (hereinafter, referred to as a first image file) uploaded from the client apparatus 10 to the server apparatus 20. Specifically, the analysis unit 213 analyzes image data of an image displayed as an image analysis target on the image confirmation page P5, in response to an analysis instruction that is a user's predetermined operation (for example, selection by a click operation on the "Analysis Start" button on the image confirmation page P5 described above).

Note that a timing at which an image file including image data is uploaded from the client apparatus 10 to the server apparatus 20 is not particularly limited. The image file may be uploaded immediately before the analysis instruction is input and the image data is analyzed, or may be uploaded to the server apparatus 20 before the analysis instruction.

The analysis result page P7, which includes the analysis result analyzed by the analysis unit 213, is output to the client apparatus 10 by the output unit 212. For example, when the analysis processing ends, the output unit 212 transmits a response including the analysis result page P7 to the client apparatus 10.

The file creation unit 214 is configured to implement a function of creating a file suitable for management including the analysis result analyzed by the analysis unit 213, and is implemented in the Web application 21 in the server apparatus 20.

The file creation unit 214 creates a new image file (hereinafter, referred to as a second image file), which includes image data representing the analysis result analyzed by the analysis unit 213 and metadata including an identifier of a photographic subject included in metadata of the first image file.

Note that a timing at which the second image file is created is not particularly limited. The second image file may be created by the file creation unit 214 after the analysis processing is performed by the analysis unit 213, or the second image file may be created by the file creation unit 214, in response to a user's predetermined operation (for example, selection by a click operation on the "Save" button on the analysis result page P7 described above).

The output unit 212 not only outputs a response including the various pages described above, but also outputs the second image file to the client apparatus 10, in response to a request for download of the analysis result from the client apparatus 10. Specifically, the output unit 212 may output the second image file, for example, in response to a user's predetermined operation (for example, selection by a click operation on the "Save" button on the analysis result page P7 described above).

The classification unit 113 and the display control unit 114 are configured to implement a function of classifying and managing image files, and are implemented in the image management application 11 in the client apparatus 10.

The classification unit 113 classifies one or more first image files uploaded to the server apparatus 20 and one or more second image files downloaded from the server apparatus 20 by the identifier of the photographic subject included in the metadata of each image file.

The display control unit 114 causes image data of the one or more first image files and image data of the one or more second image files classified by the classification unit 113 to be displayed on the display unit of the client apparatus 10 for each identifier. Specifically, the display control unit 114 displays image data for each identifier in the display region of the image management application 11, which is a viewer application.

Note that the classification unit 113 may further classify image files that have not been uploaded to the server apparatus 20. In addition, the classification unit 113 may classify image files based on at least the identifier of the photographic subject, or may classify image files by using other metadata, in addition to or instead of the identifier of the photographic subject. Additionally, the display control unit 114 may cause image data to be displayed for each identifier, or may cause image data to be displayed for each other metadata.

In this way, in the system 1, the server apparatus 20 creates the second image file including the analysis result as image data so that the identifier of the photographic subject is included as metadata, and when the user requests download of the analysis result, outputs the second image file from the server apparatus 20 to the client apparatus 10. In the client apparatus 10, the image management application 11 manages the second image file downloaded from the server apparatus 20 by integrating the second image file with the first image file uploaded to the server apparatus 20. In particular, since the image files (image data) are classified by the image management application 11 on the basis of the identifier of the photographic subject taken over between image files before and after image analysis, the uploaded image file and the downloaded image file are automatically associated and managed. Therefore, by using the image management application 11, the user can associate and easily manage the downloaded image analysis result with the image data of the analysis source.

Figure 5:
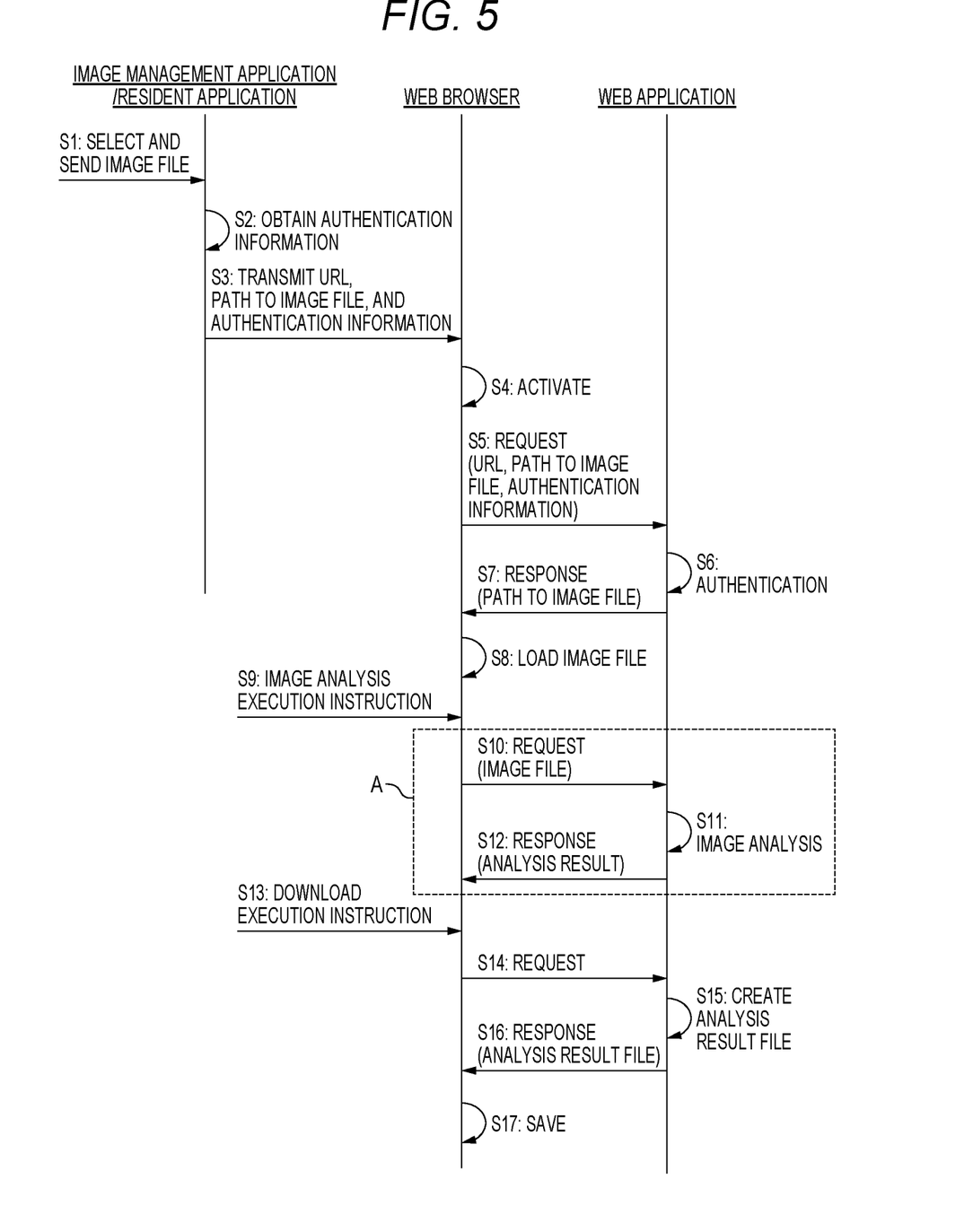
FIG. 5 shows an example of a sequence diagram showing exchange between applications operating on the system according to one illustrative embodiment.
Figure 6:
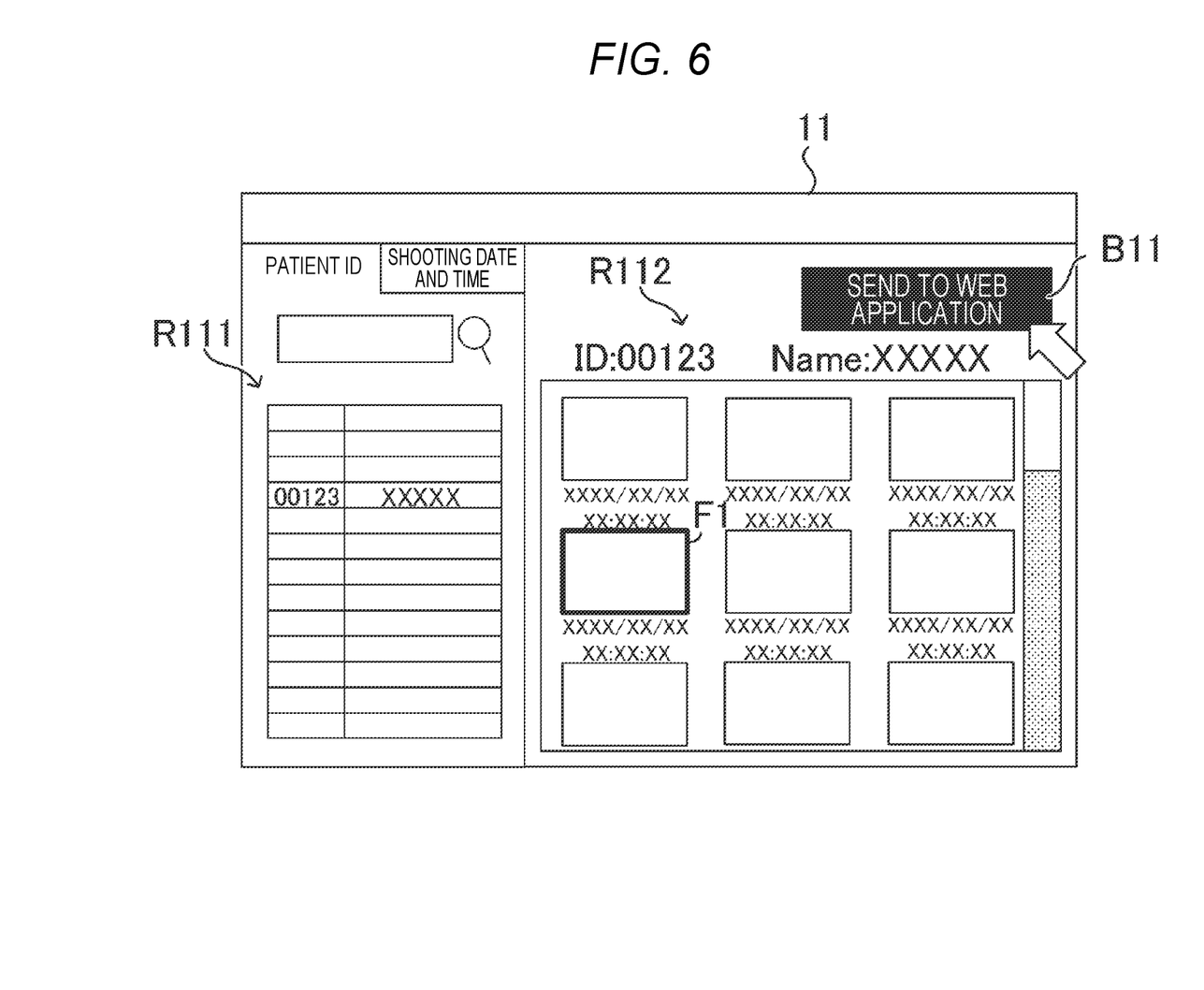
FIG. 6 is a view for illustrating a method for activating a Web browser via a viewer.
Figure 7:
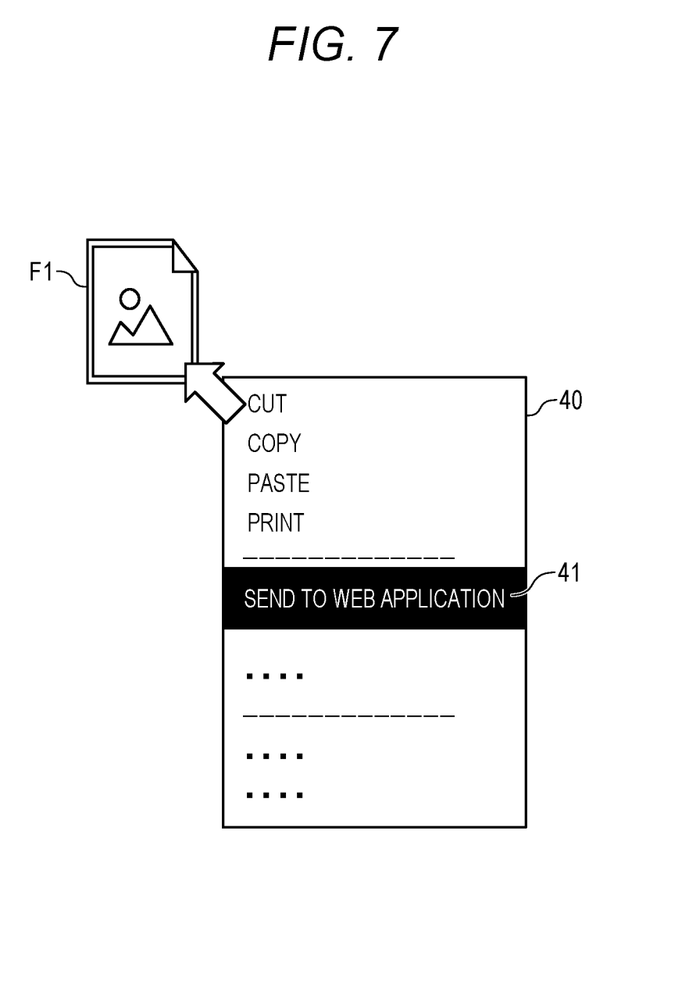
FIG. 7 is a view for illustrating a method for activating the Web browser via a resident application.

FIG. 5 is an example of a sequence diagram showing exchange between applications operating on the system 1 according to the present illustrative embodiment. FIG. 6 is a view for illustrating a method for activating the Web browser 13 via a viewer. FIG. 7 is a view for illustrating a method for activating the Web browser 13 via a resident application.

Figure 8:
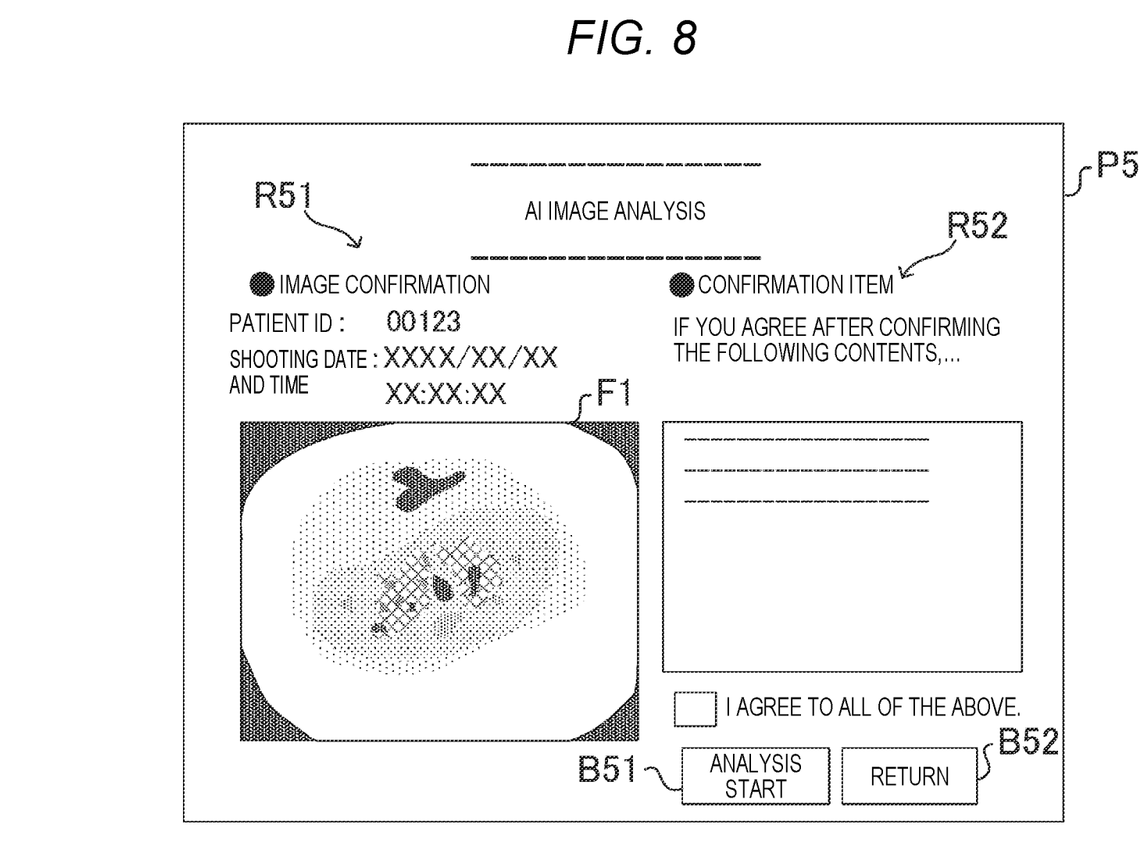
FIG. 8 is a view showing an example of an image confirmation page.
Figure 9:
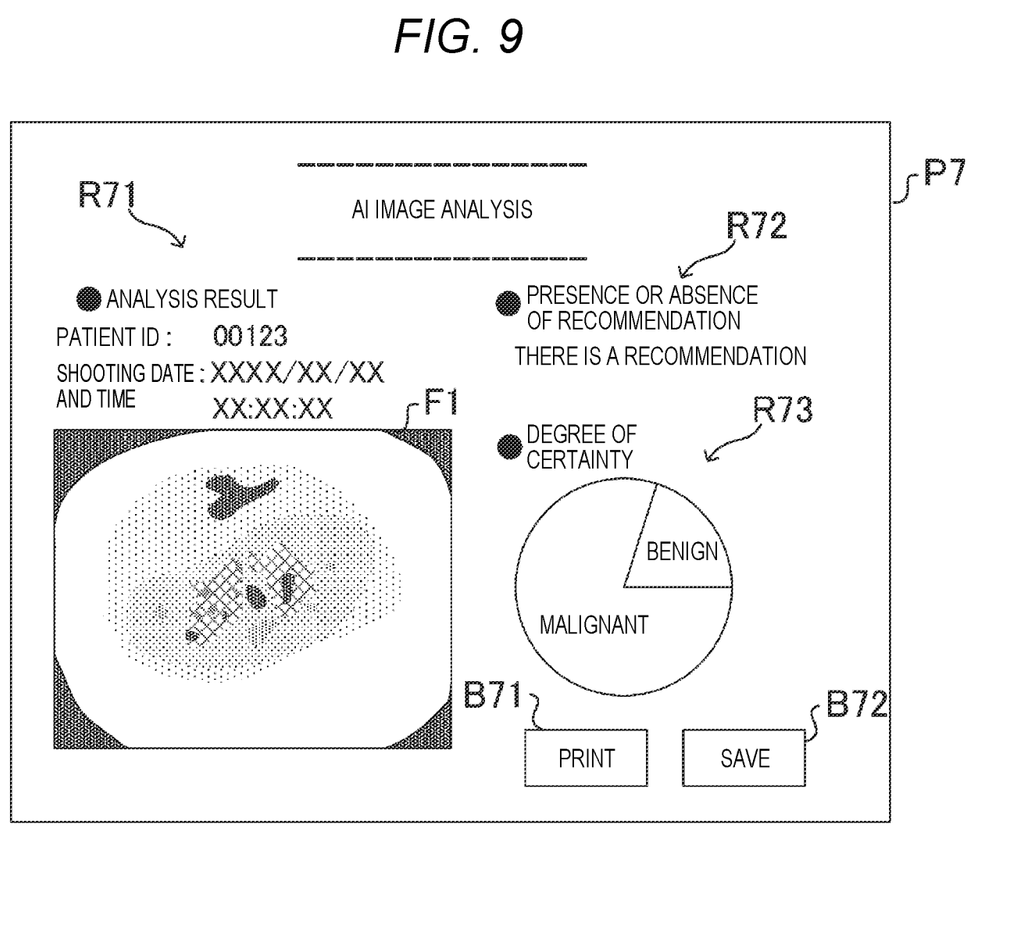
FIG. 9 is a view showing an example of an analysis result page.

FIG. 8 is a view showing an example of the image confirmation page P5. FIG. 9 is a view showing an example of the analysis result page P7. Below, a specific example of processing that is performed in the system 1 will be described with reference to FIGS. 5 to 9.

An example of processing in which an image file is uploaded from the client apparatus 10 to the server apparatus 20 and is analyzed in the server apparatus 20, and an analysis result is downloaded will be described.

First, the image management application 11 detects a user's operation for transmitting a selected image file to the Web application 21 (step S1). Here, the image management application 11 detects that a button B11 is selected by a click operation in a state in which the image file F1 is selected, as shown in FIG. 6, for example.

Note that in the image management application 11 shown in FIG. 6, a region R111 is a region for selecting metadata for narrowing down image files that are managed by the image management application 11. FIG. 6 shows an example of narrowing down the image files with the patient ID (here, "00123"), which is an identifier of the photographic subject included in the image file. In addition, a region R112 is a region for displaying a list of image data of image files corresponding to the metadata specified in the region R111. FIG. 6 shows an aspect in which a list of the image data of the image files having the metadata of the patient ID "00123" is displayed and the image file F1 is selected.

Next, the image management application 11 obtains the authentication information saved in the client apparatus 10 (step S2). Here, the image management application 11 obtains, for example, authentication information registered at the time of installation of the image management application 11 by reading the authentication information from a configuration file of the image management application 11.

Thereafter, the image management application 11 transmits a URL of the Web application 21, a path to the image file F1, and the authentication information to the Web browser 13 (step S3). The URL of the Web application 21 is a predetermined URL and is registered in the image management application 11. In addition, the path to the image file F1 is the information obtained at the time when the operation is detected in step S1. Additionally, the authentication information is the authentication information obtained in step S2.

Note that steps S1 to S3 may be performed in the resident application 12. In step S1, the resident application 12 may detect that a menu button 41 of "Send to Web application" is selected by a click operation from a context menu 40 displayed in the state in which the image file F1 is selected, as shown in FIG. 7.

Then, when the resident application 12 detects selection of the menu button 41 by a click operation, in step S2, the resident application may obtain the authentication information registered in the resident application 12, and in step S3, transmit the URL of the Web application 21, the path to the selected image file F1 and the authentication information obtained in step S2 to the Web browser 13.

The Web browser 13 is activated when data is transmitted from the image management application 11 or the resident application 12 (step S4). In addition, the Web browser 13 transmits, to the Web application 21, a request for the URL of the Web application 21, including the path to the image file F1 and authentication information received from the image management application 11 or the resident application 12 (step S5).

Note that a method for transmitting the request parameter (in this case, the path to the image file and the authentication information) in step S5 is not particularly limited. For example, the path to the image file and the authentication information may be sent to the Web application 21 as a query character string in the URL by using a GET method of HTTP (which is an abbreviation for Hypertext Transfer Protocol). In addition, by using a POST method of the HTTP, the path to the image file path and the authentication information may be embedded in a body of the request and sent to the Web application 21.

However, in general, when security is considered important, the data is preferably sent using the POST method. In particular, by using encrypted communication such as HTTPS (which is an abbreviation for Hypertext Transfer Protocol Secure) in the POST method, the risk of the path to the image file path and the authentication information being stolen or misused can be sufficiently suppressed.

The Web application 21 that has received the request performs authentication processing by using the authentication information included in the request (step S6), and then sends a response to the Web browser 13 (step S7). If the authentication processing is successful in step S6, the Web application 21 transmits a response including the image confirmation page P5 in step S7. The image confirmation page P5 transmitted from the Web application 21 to the Web browser 13 includes the path to the image file F1.

The Web browser 13 that has received the response loads the image file F1 from the path to the image file F1 included in the image confirmation page P5 (step S8). Thereby, the image data of the image file F1 is displayed in the image confirmation page P5 on the Web browser 13, as shown in FIG. 8.

Note that in the image confirmation page P5 shown in FIG. 8, a region R51 is a region for displaying the information on the image file F1. FIG. 8 shows an aspect in which the patient ID ("00123") and information on the shooting date and time included in the image file F1 are displayed together with the image data of the image file F1 loaded from the client apparatus 10 in step S8. In addition, a region R52 is a region for displaying an item that the user should confirm in advance when analyzing an image. Note that the analysis start button (button B51) may be validated and subjected to a selectable state when a check is input to a checkbox provided in the region R52.

When the user who has confirmed the image confirmation page P5 selects the analysis start button (button B51) by a click operation, the Web browser 13 detects an analysis execution instruction (step S9) and transmits a request including the image file F1 to the Web application 21, as a request for execution of image analysis (step S10). That is, in step S10, the Web browser 13 uploads the image file F1 to the Web application 21, for example, by transmitting the image file with the POST method.

The Web application 21 that has received the request analyzes the image data of the image file F1 included in the request (step S11), and transmits a response including an analysis result to the Web browser 13 (step S12). Specifically, in step S12, the Web application 21 transmits a response including the analysis result page P7 shown in FIG. 9.

Note that in the analysis result page P7 shown in FIG. 9, a region R71 is a region for displaying the information on the image file F1. The region R71 is similar to the region R51 of the image confirmation page P5 shown in FIG. 8. In addition, a region R72 is a region for displaying recommendation information, and a region R73 is a region for displaying an analysis result. In this example, the region R73 indicates that there is a high probability that the lesion shown in an image is malignant, so the region R72 indicates a determination that it is necessary to recommend a medical institution for the patient.

When the user who has confirmed the analysis result page P7 selects a print button (button B71) by a click operation, the Web browser 13 detects a download execution instruction (step S13), and transmits a request for download of the analysis result to the Web application 21 (step S14).

The Web application 21 that has received the request creates an analysis result file A1 (step S15), and transmits a response including the analysis result file A1 to the Web browser 13 (step S16). Note that the analysis result file A1 is an image file including, for example, a content of the analysis result page P7 as image data.

The Web browser 13 saves the analysis result file A1 included in the response in the client apparatus 10 (step S17). Note that a location where the analysis result file A1 is saved is not particularly limited. The analysis result file can be saved in any folder designated by the user.

However, when the image management application 11 manages image files in a specific folder, the analysis result file is preferably saved in the folder. Thereby, the analysis result file A1 can be managed by the image management application 11 immediately after download.

Here, a notification indicating that the Web application 21 is executing processing corresponding to the request is displayed on the Web browser 13 until the Web application 21 transmits the response corresponding to the request in step S10 (request for execution of image analysis) to the Web browser 13.

That is, the Web browser 13 displays the notification after the request in step S10 is transmitted until the response is received. The notification indicates a processing status of the Web application 21 corresponding to the request in step S10. The notification is a message such as "AI image analysis in progress."

In the related art, there is a case where when processing corresponding to a request is completed in an extremely short time on a server side, a notification indicating the processing status instantly disappears from a screen of a client apparatus. There is a case where the notification that has instantly disappeared is seen as a display malfunction (for example, flickering or bugs on the screen) to a user. In this case, a problem that it is difficult for the user to recognize that the processing has been performed properly is pointed out.

The Web application 21 operates as follows in order to make it easier for a user to recognize that processing has been performed properly.

Figure 10:
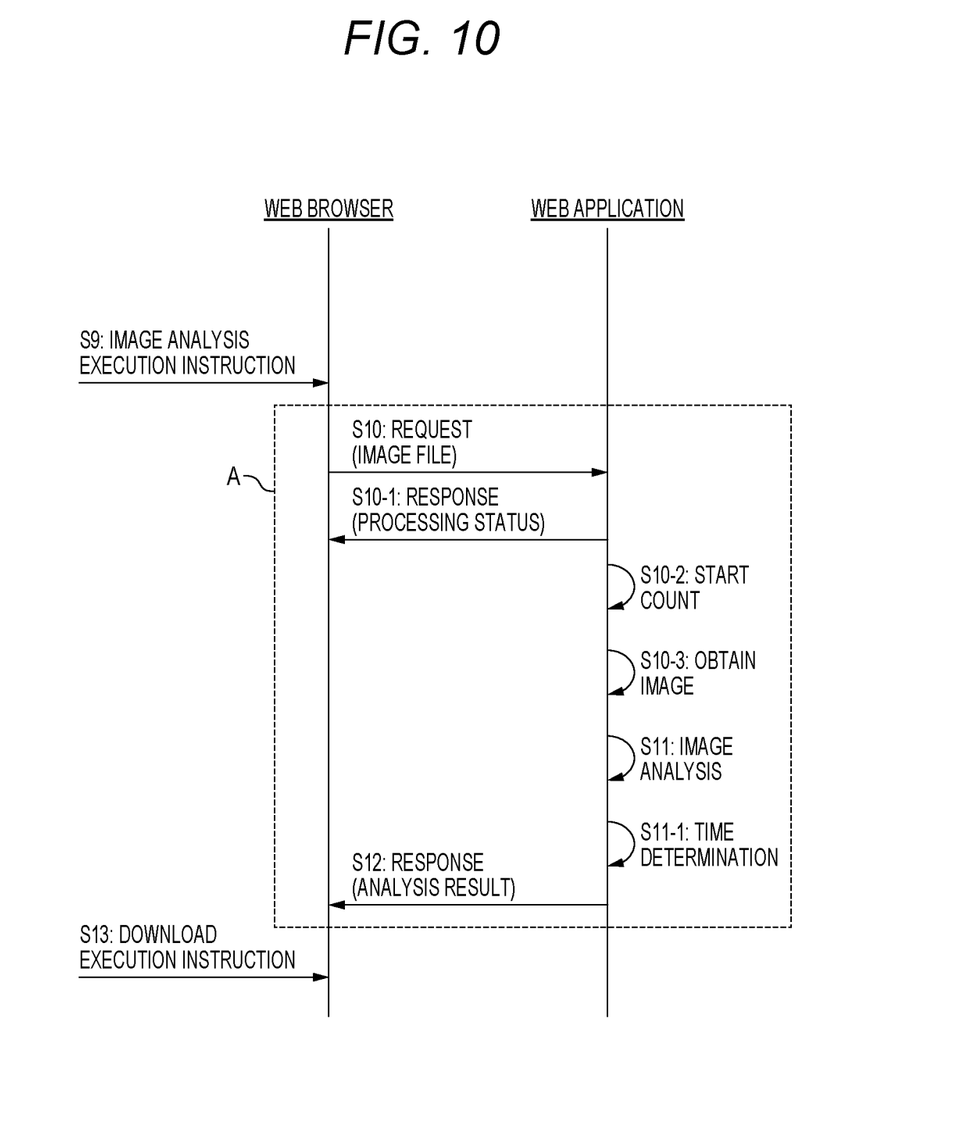
FIG. 10 is a view showing processing in a region A of the sequence diagram shown in FIG. 5 in more detail.

FIG. 10 is a view showing processing in a region A of the sequence diagram shown in FIG. 5 in more detail.

When the Web application 21 receives the request of step S10, the Web application transmits a response including the image analysis page P6 to the Web browser 13 (step S10-1).

The Web browser 13 that has received the response including the image analysis page P6 displays the image analysis page P6 on the screen of the client apparatus 10.

Figure 11:
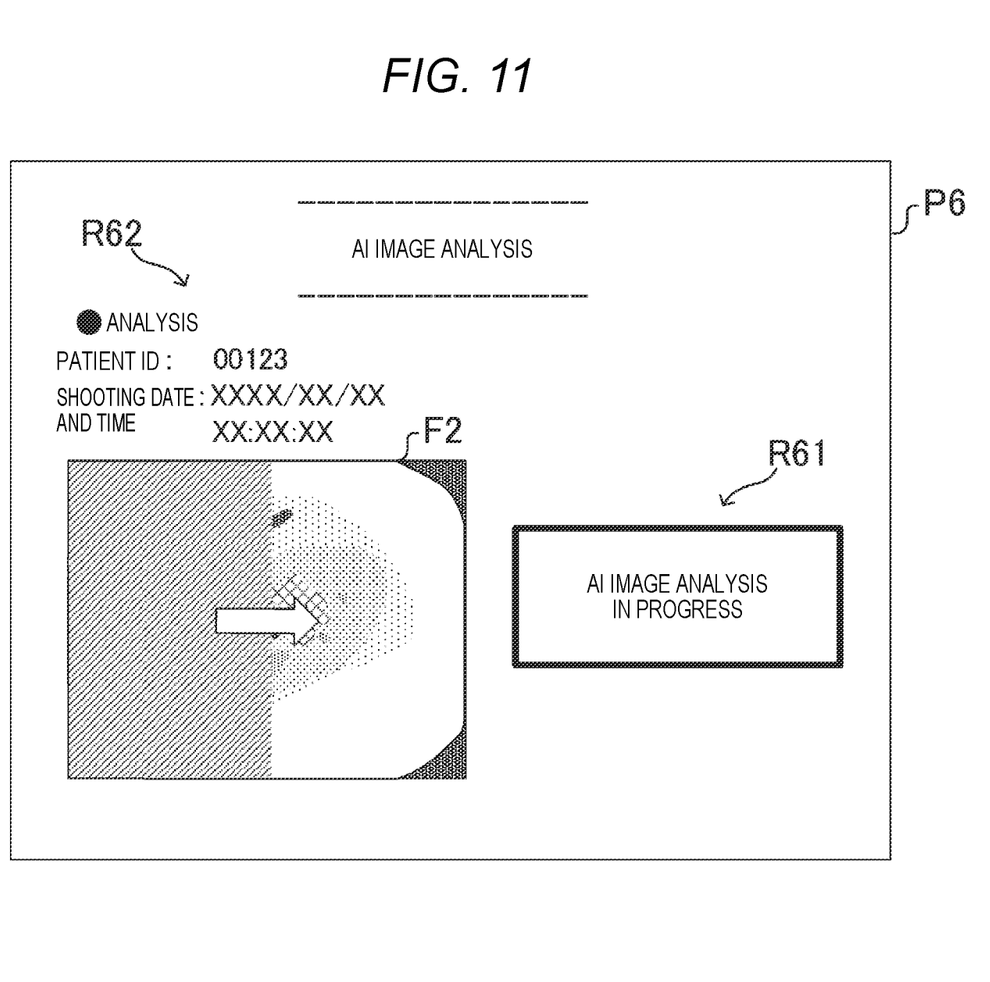
FIG. 11 is a view showing an example of an image analysis page.

FIG. 11 is a view showing an example of the image analysis page P6. In the image analysis page P6 shown in FIG. 11, a region R61 is a region for displaying a notification indicating a processing status of the Web application 21 corresponding to the request of step S10. The notification displayed in the region R61 is a visual notification such as a message. By way of example, the notification is "AI image analysis in progress."

Note that the processing status corresponding to the request of step S10 may also be notified by sound, instead of or in addition to a visual notification such as a message. When the client apparatus 10 is a mobile terminal such as a smart phone, the processing status may also be notified using a vibration function of the mobile terminal.

The notification displayed in the region R61 is an example of a predetermined notification indicating the processing status of the Web application 21 corresponding to the request of step S10. Incidentally, the notification indicates that processing (image acquisition processing, image analysis processing) related to image data (an example of the data) is being executed.

In this way, the Web application 21 transmits the response including the image analysis page P6 to the Web browser 13 (an example of the client), thereby causing the Web browser 13 to start displaying the notification (an example of the predetermined notification) indicating the processing status of the Web application 21 corresponding to the request of step S10.

In the image analysis page P6 shown in FIG. 11, a region R62 is a region for displaying an image F2 indicating the processing status of the Web application 21 corresponding to the request of step S10.

In the present illustrative embodiment, an animation that simulates the processing status of the Web application 21 corresponding to the request of step S10 is displayed in the region R62. By way of example, an animation in which an image is gradually painted out from left toward right is displayed. The user who sees this animation can intuitively recognize that the image analysis is being executed on the server side.

For example, when the Web browser 13 executes a program such as JavaScript (registered trademark) embedded in the response including the image analysis page P6, the above animation is displayed on the screen of the client apparatus 10. Note that the above animation may be displayed on the screen of the client apparatus 10 by executing a program on the server side rather than on the client side.

In this way, during a period in which the Web browser 13 (an example of a client) is caused to display a notification of "AI image analysis in progress", the Web application 21 causes the Web browser 13 to display an animation as well (an example of a production) indicating that analysis processing is in progress.

One of functions implemented in the Web application 21 is the time management unit 215. The Web application 21 operates as the analysis unit 213 and the like, and also operates as the time management unit 215 after transmitting the response including the image analysis page P6 until transmitting the response including the analysis result page P7.

Specifically, the Web application 21 operating as the time management unit 215 resets a count value of a built-in counter of the server apparatus 20 to zero and then starts the counter (step S10-2).

The Web application 21 obtains the image file F1 included in the request uploaded in step S10 (step S10-3). Note that the Web browser 13 can upload the image file F1 to the server apparatus 20 in advance. When the image file F1 has been uploaded to the server apparatus 20 in advance, in step S10-3, the Web application 21 reads out the image file F1 from a URL of the saving location. The URL of the saving location is included in the request uploaded in step S10, for example.

The Web application 21 analyzes the image data of the image file F1 obtained in step S10-3 (step S11). That is, the Web application 21 executes analysis processing (an example of the first processing) on the image data of the image file F1 (an example of data to be processed).

When the analysis processing is completed, the Web application 21 determines whether a predetermined time T or longer has elapsed after causing the Web browser 13 to display the notification of "AI image analysis in progress" (step S11-1). Specifically, the Web application 21 determines whether the count value of the built-in counter is equal to or larger than a predetermined value. If the count value is equal to or larger than a predetermined value, the Web application 21 considers that the predetermined time period T or longer has elapsed after causing the Web browser 13 to display the notification of "AI image analysis in progress."

When the analysis processing is completed and the predetermined time period T or longer has elapsed after causing the Web browser 13 to display the notification of "AI image analysis in progress", the Web application 21 transmits a response including the analysis result page P7 to the Web browser 13 (step S12). Thereby, the screen of the client apparatus 10 transitions from the image analysis page P6 to the analysis result page P7.

That is, the Web application 21 transmits the response including the analysis result page P7 to the Web browser 13 (an example of the client), thereby causing the Web browser 13 to end the displaying of the image analysis page P6 (in other words, a page including the notification indicating the processing status of the Web application 21).

In the present illustrative embodiment, the notification indicating the processing status of the Web application 21 is displayed on the screen of the client apparatus 10 for at least a predetermined time T (for example, 5 seconds). For this reason, even when the analysis processing by the Web application 21 is completed instantly, the notification does not disappear from the screen in an instant. For this reason, it is possible to avoid a problem that the notification is seen as a display malfunction (for example, flickering or bugs on the screen) to the user. The user can confirm the analysis result after seeing the notification displayed for at least a predetermined time T. The user can easily recognize that the analysis processing has been performed properly.

A length of the predetermined time T used in the time determination processing (step S11-1) is, for example, set in advance, but the configuration of the present disclosure is not limited thereto. The length of the predetermined time T may be arbitrarily changed by the user by operating the Web browser 13.

In addition, the length of the predetermined time T may be optimized by a learning function of the Web application 21. By way of example, each time the processing shown in the sequence diagram of FIG. 5 is executed, the Web application 21 stores, in a memory of the server apparatus 20, a history of a time consumed after transmitting the response including the image analysis page P6 to the Web browser 13 (in other words, after causing the Web browser 13 to display the notification of "AI image analysis in progress") until the analysis processing on the image data is completed.

The Web application 21 sets the length of the predetermined time T on the basis of a plurality of histories stored in the memory of the server apparatus 20. By way of example, the Web application 21 sets an average time of the history to the length of the predetermined time T. By optimizing the predetermined time T, it is possible to avoid the predetermined time T from being unnecessarily long while avoiding the notification from being seen as a display malfunction by the user.

The illustrative embodiment described above shows a specific example in order to easily understand the invention, and the present invention is not limited to the illustrative embodiment described above, and should be understood to include a variety of modifications and alternations of the illustrative embodiment described above. For example, it would be understood that the illustrative embodiment described above can be embodied by modifying the elements without departing from the scope thereof. In addition, it would be understood that various illustrative embodiments can be implemented by appropriately combining the plurality of elements disclosed in the illustrative embodiment described above. Further, one skilled in the art would understand that various illustrative embodiments can be implemented by omitting some elements from all the elements shown in the illustrative embodiment or adding some elements to the elements shown in the illustrative embodiment. That is, the program, the server apparatus, the client apparatus, the system, the method that is implemented by the server apparatus, and the method that is implemented by the client apparatus can be diversely modified and changed without departing from the description of the claims.

For example, the hardware configurations of the client apparatus 10 and the server apparatus 20 are not particularly limited. The server apparatus 20 is shown as a single apparatus in FIG. 2, but may be configured by a plurality of apparatuses. The client apparatus 10 and the server apparatus 20 may be computers each provided with a processor and a memory. The above-described functional configurations of the client apparatus 10 and the server apparatus 20 may be implemented by the processor executing the program on the memory.

The processor is not particularly limited, but may be, for example, a central processing unit (which is abbreviated as CPU), a graphics processing unit (which is abbreviated as GPU) or the like. In addition, the processor may include a hardware circuit such as a field-programmable gate array (which is abbreviated as FPGA) and an application specific integrated circuit (which is abbreviated as ASIC). The memory is not particularly limited, but may be a semiconductor memory such as a random access memory (which is abbreviated as RAM), a read only memory (which is abbreviated as ROM) and a solid state drive (which is abbreviated as SSD), a magnetic storage device such as a hard disk drive (which is abbreviated as HDD), an optical memory device, or a non-transitory computer-readable medium readable by a computer.

In the illustrative embodiment described above, an operation of moving a pointer in the display screen to a predetermined position and clicking a mouse has been exemplified as the operation of selecting an image file, a button, or a link. However, the selection operation is not limited to a specific operation. When the client apparatus 10 has a touch panel display, the operation may be an operation of tapping the display screen.

What is claimed is:

1. A method comprising:
    causing a client apparatus to start displaying a notification that image processing is being executed;
    executing image processing of data;
    responsive to completing the image processing of the data, determining that an elapsed time from causing the client apparatus to start displaying the notification is less than a predetermined time;
    responsive to determining that the elapsed time is less than the predetermined time, refraining from causing the client apparatus to end the displaying of the notification;
    after refraining from causing the client apparatus to end the displaying of the notification, determining that the elapsed time is greater than or equal to the predetermined time; and
    responsive to determining that the elapsed time is greater than or equal to the predetermined time, causing the client apparatus to end the displaying of the notification.

2. The method according to claim 1, wherein:
    the data is image data; and
    the image processing is analysis processing of the image data.

3. The method according to claim 2, wherein the notification indicates that the analysis processing is in progress.

4. The method according to claim 1, wherein:
    the method is performed by a server apparatus; and
    the method further comprises:
        storing, in a memory of the server apparatus, a history of elapsed times for a plurality of instances of image processing, and
        determining the predetermined time based on the history of elapsed times.

5. A non-transitory computer-readable storage medium storing instructions that, when executed by at least one processor, cause the at least one processor to:
    cause a client apparatus to start displaying a predetermined notification that image processing is being executed;
    execute image processing of data;
    responsive to completing the image processing of the data, determine that an elapsed time from causing the client apparatus to start displaying the notification is less than a predetermined time;

responsive to determining that the elapsed time is less than the predetermined time, refrain from causing the client apparatus to end the displaying of the notification;

after refraining from causing the client apparatus to end the displaying of the notification, determine that the elapsed time is greater than or equal to the predetermined time; and responsive to determining that the elapsed time is greater than or equal to the predetermined time, cause the client apparatus to end the displaying of the notification.

6. An information processing apparatus comprising a processor configured to:

cause a client apparatus to start displaying a notification that image processing is being executed;

execute image processing of data;

responsive to completing the image processing of the data, determine whether an elapsed time from causing the client apparatus to start displaying the notification is less than a predetermined time;

responsive to determining that the elapsed time is equal to or greater than the predetermined time, cause the client apparatus to end the displaying of the notification;

responsive to determining that the elapsed time is less than the predetermined time, refrain from causing the client apparatus to end the displaying of the notification;

after refraining from causing the client apparatus to end the displaying of the notification, determine that the elapsed time is greater than or equal to the predetermined time; and responsive to determining that the elapsed time is greater than or equal to the predetermined time, cause the client apparatus to end the displaying of the notification.

7. The information processing apparatus according to claim 6, wherein:

the data is image data; and the image processing is analysis processing of the image data.

8. The information processing apparatus according to claim 7, wherein the notification indicates that the analysis processing is in progress.

9. The information processing apparatus according to claim 6, wherein the processor is further configured to:

store, in a memory of the information processing apparatus, a history of elapsed times for a plurality of instances of image processing, and determine the predetermined time based on the history of elapsed times.

* * * * *

UNITED STATES PATENT AND TRADEMARK OFFICE
CERTIFICATE OF CORRECTION

PATENT NO. : 12,219,104 B2
APPLICATION NO. : 18/543464
DATED : February 4, 2025
INVENTOR(S) : Nobuhiro Aoki Page 1 of 1

It is certified that error appears in the above-identified patent and that said Letters Patent is hereby corrected as shown below:

In the Claims

Column 14, Claim 5, Lines 61-62, should read:
cause a client apparatus to start displaying a notification that image
processing is being Signed and Sealed this
Seventh Day of October, 2025

John A. Squires
*Director of the United States Patent and Trademark Office*